United States Patent [19]
Kuiri

[11] Patent Number: 5,877,564
[45] Date of Patent: Mar. 2, 1999

[54] MOBILE STATION VOLTAGE SUPPLY USING LEVEL SHIFT OF BASE BAND OPERATING VOLTAGES

[75] Inventor: Tapio Kuiri, Oulu, Finland

[73] Assignee: Nokia Mobile Phones Limited, Salo, Finland

[21] Appl. No.: 800,571

[22] Filed: Feb. 18, 1997

[51] Int. Cl.⁶ ..................................................... H02J 3/12
[52] U.S. Cl. ................. 307/38; 307/29; 326/63; 326/102; 327/434; 320/125; 455/343; 455/572
[58] Field of Search .................................. 307/29, 38, 28; 340/825.69; 326/63, 102; 327/434; 320/6; 455/38.3, 343, 575, 572

[56] References Cited

U.S. PATENT DOCUMENTS

| 4,877,982 | 10/1989 | Walker ..................................... 327/434 |
| 5,276,366 | 1/1994 | Quigley et al. ............................ 326/63 |
| 5,623,533 | 4/1997 | Kikuchi et al. ......................... 455/38.3 |
| 5,656,915 | 8/1997 | Eaves ......................................... 320/6 |
| 8,490,843 | 6/1995 | Kuiri ......................................... 379/58 |

*Primary Examiner*—William M. Shoop, Jr.
*Assistant Examiner*—Albert W. Paladini
*Attorney, Agent, or Firm*—Perman & Green, LLP

[57] ABSTRACT

A wireless communicator, such as a cellular telephone or personal communicator, includes a power source (e.g., two series connected batteries) providing output voltages VSS, VDD, and V1, where V1=(VDD−VSS)/2. The power source is coupled to a first load for powering the first load with VSS and VDD. The wireless communicator further includes a power source switching unit having first inputs coupled to VSS, VDD and V1, a second input coupled to a MODE signal, and outputs coupled to a second load. The power source switching unit is responsive to a first state of the MODE signal for powering the second load with VSS and V1, and is responsive to a second state of the MODE signal for powering the second load with V1 and VDD. By periodically toggling the MODE signal, such as at a frame rate of the wireless communicator, the power drawn from each battery by the second load is equalized, while providing the second load with a desired lower operating voltage. Also shown is interface circuitry for level shifting signals output from the first load to the second load, and signals output from the second load to the first load. The interface circuitry is also responsive to the state of the MODE signal for accommodating the changes in levels of the second load input/output signals between VSS-V1, and V1-VDD.

18 Claims, 6 Drawing Sheets

MOBILE STATION VOLTAGE SUPPLY USING LEVEL SHIFT OF BASE BAND OPERATING VOLTAGES

FIELD OF THE INVENTION

This invention relates generally to DC power supplies and, in particular, to battery powered wireless communicators, such as cellular telephones and personal communicators.

BACKGROUND OF THE INVENTION

A battery powered cellular telephone includes a number of different types of circuitry. The circuitry can be distinguished generally as RF circuitry and base band circuitry. It is typically the case that the supply voltage requirements of these two types of circuitries differ, with the RF circuitry requiring a higher supply voltage. For example, the RF circuitry power amplifier will generally be operated more efficiently at a higher voltage (e.g., around 4.5 volts) than at a lower voltage at which the base band circuits, such as a central processor unit (CPU) and/or a digital signal processor ((DSP), are typically operated.

It is known in the art to use a number of voltage regulators that provide various supply voltages. However, if a linear voltage regulator is used to provide the lower voltage requirements of the base band circuitry, considerable additional power consumption can occur, as well as an undesirable heating effect. By example, if the regulator is required to provide 3 volts at 10 mA, and is connected across a six volt battery, at total of 0.01 A×3 V=0.03 W is generated and must be dissipated.

Alternatively, a lower voltage that supplies the base band circuitry can be stepped up to a higher voltage, such as with a chopper or switched capacitor arrangement, to supply the higher RF circuit voltage. However, this technique is undesirable at least for the reasons that it inherently generates switching noise which can affect circuit operation, and it furthermore may cause an undesirable audible signal.

One could provide two or more cells in series and connect the RF circuitry across all of the cells, while connecting the base band circuitry across fewer cells, thereby providing a lower voltage to the base band circuitry. However, it can be appreciated that this technique will more rapidly discharge the cell or cells that are required to supply both the RF circuitry and the baseband circuitry. An additional problem is created when the cells are recharged, as the cells are recharged in a series configuration. This type of connection between the cells and the loads is obviously an undesirable compromise.

OBJECTS OF THE INVENTION

It is thus a first object of this invention to provide an improved method for providing operating voltages to circuitry in a battery powered device.

It is a second object of this invention to provide a wireless communicator with series connected batteries that are evenly discharged while providing multiple output operating voltages.

SUMMARY OF THE INVENTION

The foregoing and other problems are overcome and the objects of the invention are realized by methods and apparatus in accordance with embodiments of this invention.

This invention teaches a wireless communicator, such as a cellular telephone or personal communicator, that includes a power source (e.g., two series connected batteries) providing output voltages VSS, VDD, and V1, where V1=(VDD−VSS)/2. The power source is coupled to a first load for powering the first load with VSS and VDD. The wireless communicator further includes a power source switching unit having first inputs coupled to VSS, VDD and V1, a second input coupled to a MODE signal, and outputs coupled to a second load. The power source switching unit is responsive to a first state of the MODE signal for powering the second load with VSS and V1, and is responsive to a second state of the MODE signal for powering the second load with V1 and VDD. By periodically toggling the MODE signal, such as at a frame rate of the wireless communicator, the power drawn from each battery by the second load is equalized, while providing the second load with a desired lower operating voltage.

This invention also teaches interface circuitry for level shifting signals output from the first load to the second load, and signals output from the second load to the first load. The interface circuitry is also responsive to the state of the MODE signal for accommodating the changes in levels of the second load input/output signals between VSS-V1, and V1-VDD.

A method is also disclosed for operating the personal communicator in accordance with the foregoing features.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
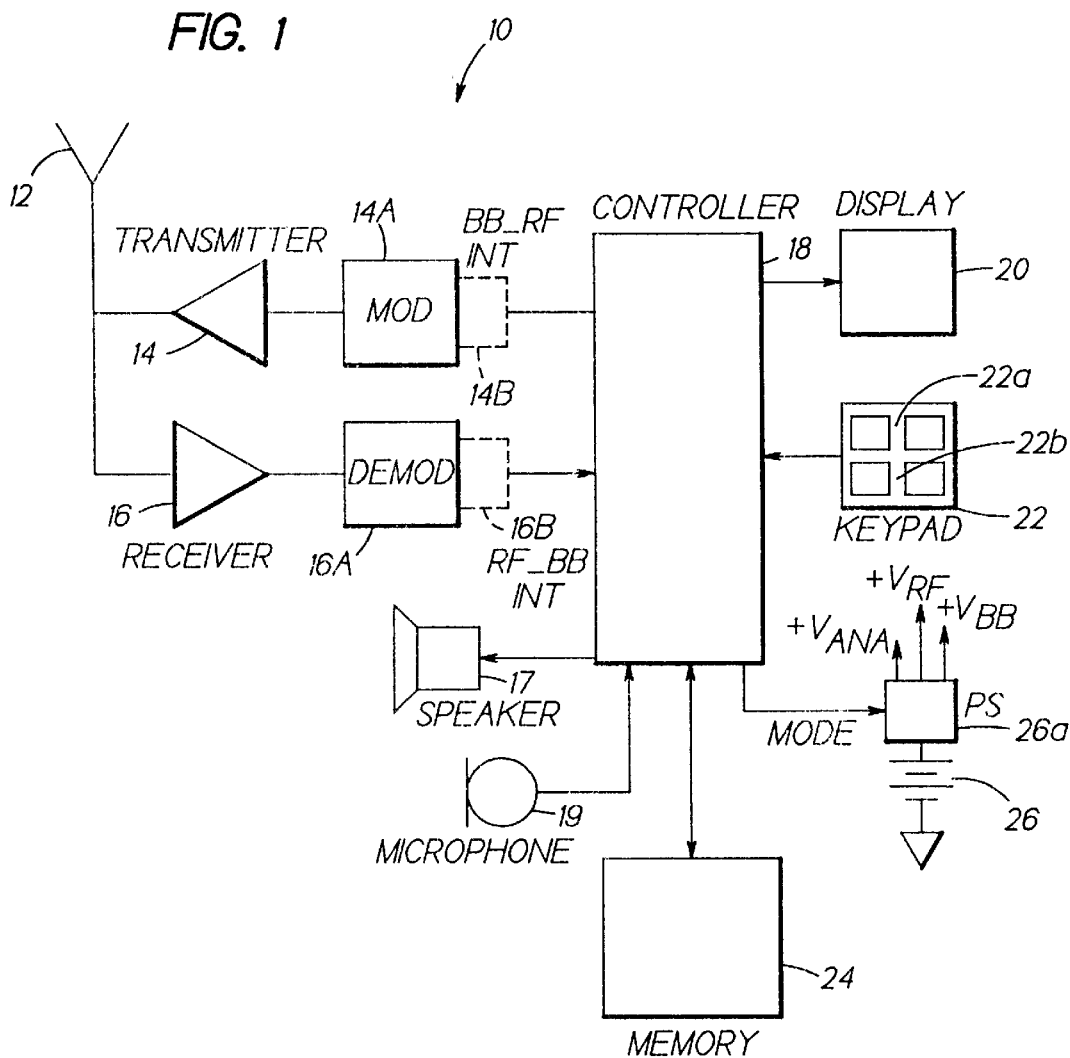
FIG. 1 is a block diagram of a mobile station that is constructed and operated in accordance with this invention.
Figure 2:
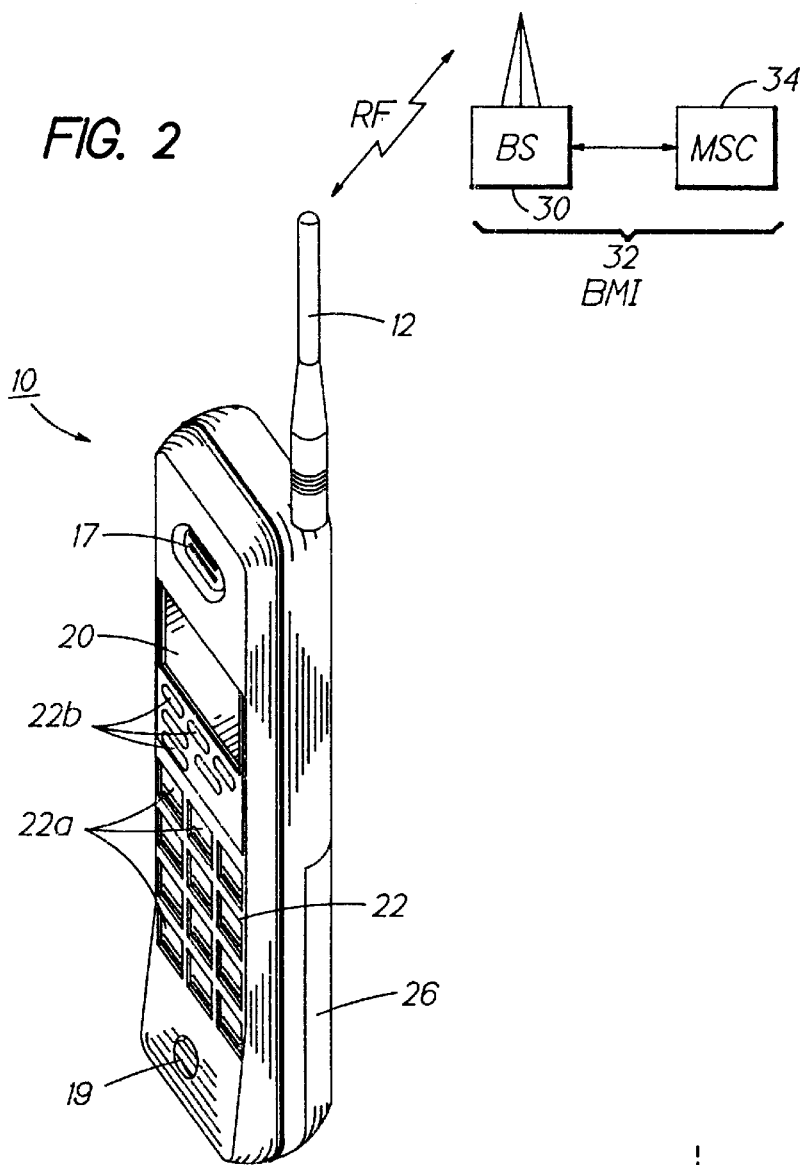
FIG. 2 is an elevational view of the mobile station shown in FIG. 1, and which further illustrates a cellular communication system to which the mobile station is bidirectionally coupled through wireless RF links.

Reference is first made to FIGS. 1 and 2 for illustrating a wireless communicator or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 may be a part of a cellular network comprising a Base Station/Mobile Switching Center/Interworking function (BMI) 32 that includes a mobile switching center (MSC) 34. The MSC 34 provides a connection to landline trunks when the mobile station 10 is involved in a call.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The teaching of this invention is not limited for use with any particular air interface standard, although it will be shown below that an air interface standard that operates with frames of speech and/or signalling data, such as a time division, multiple access (TDMA) system, is preferred. One suitable, but not limiting TDMA standard, is known as EIA/TIA IS-136.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. These various circuits may be referred to as "base band" circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key.

The mobile station 10 also includes a battery 26 and a power supply 26a for powering the various circuits that are required to operate the mobile station. The battery 26 and power supply 26a are of most concern to the teaching of this invention, and will be described in further detail below.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user.

It should be understood that the mobile station 10 can be a vehicle mounted or a handheld device. It should further be appreciated that the mobile station 10 can be capable of operating with one or more air interface standards, modulation types, and access types. By example, the mobile station may be capable of operating with any of a number of other standards besides IS-136, such as GSM (TDMA) and IS-95 (CDMA). Conventional analog mobile stations (e.g., AMPS) may also benefit from the teaching of this invention, as should dual or higher mode phones (e.g., digital/analog or TDMA/CDMA/analog phones). It should thus be clear that the teaching of this invention is not to be construed to be limited to any one particular type of mobile station or air interface standard.

Figure 3:
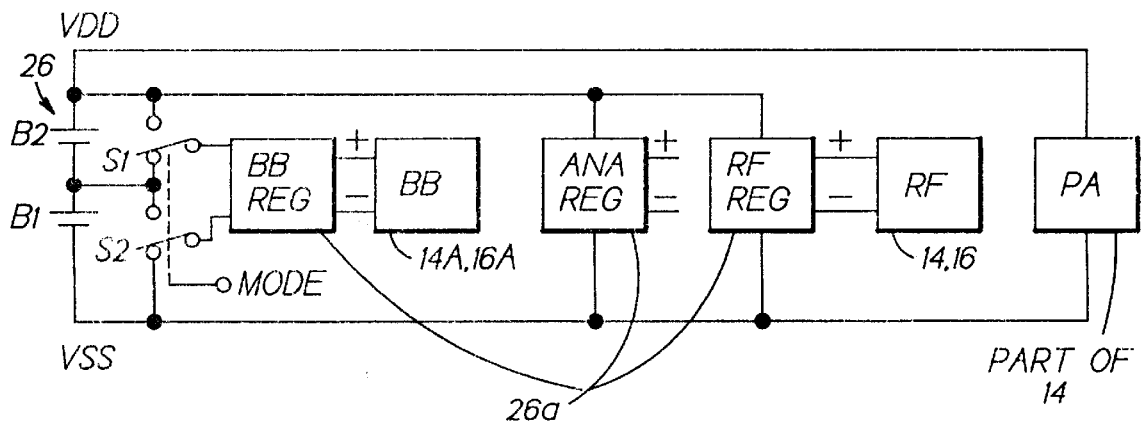
FIG. 3 is a block diagram illustrating a power supply and power distribution system in accordance with a preferred embodiment of this invention.

Referring now FIG. 3, there is illustrated in greater detail the battery 26 and the power supply 26a. For the ensuing discussion the battery is assumed to include two series connected lithium ion 3.6 volt batteries B1 and B2, yielding a nominal VDD value of 7.2 volts. In other embodiments of this invention NiCd batteries may be employed, as may NiNH batteries. By example, two 2.4 V batteries could be used such that VDD is equal to 4.8 volts. The teaching of this invention is thus not to be construed to be limited to any particular battery type or cell voltages. In general, the battery type and number of cells is selected as a function of cost, size, and the voltage requirements of the circuitry used in the mobile station 10.

VDD directly powers the RF power amplifier (PA), as well as any analog circuits (not shown) through voltage regulator (ANA REG), and an RF circuits voltage regulator (RF REG). These circuits may be collectively referred to as a first load. In some embodiments of the invention these various regulators may not be required. By example, in some embodiments the RF REG may be eliminated, and the RF circuitry powered directly from VDD.

In accordance with an aspect of this invention, B1 and B2 are connected with switches S1 and S2 to the input of a base band voltage regulator (BB REG), which outputs a regulated voltage equal to about VDD/2 (actually (VDD−VSS)/2, for the case where VSS may not equal zero) to the base band circuits, such as the CPU and DSP that form a portion of the controller 18. These circuits may be considered as a second load that is distinguished from the first load at least by requiring a different operating voltage. Switches S1 and S2 are preferably low loss MOSFET switches that are controlled by a switching signal (MODE). When MODE is high, the illustrated switch position, the input to the BB REG is connected only across B1, i.e., between zero volts (ground or VSS) and 3.6 volts, also referred to as +V1 or simply as V1. When MODE is low, S1 and S2 assume the opposite switch position, and the input to the BB REG is connected only across B2, i.e., between +V1 and VDD, also referred to as +V2. The optional BB REG regulates the input voltage and supplies output voltages +V BB and −V BB to the base band circuitry. If the BB REG is not required, the base band circuitry can be connected directly to the output terminals of S1 and S2.

In accordance with a further aspect of this invention the MODE signal is repetitively toggled so as to power the base band circuitry from B1, then B2, then B1, etc. In this manner the power consumed by the lower voltage base band circuitry does not unbalance the discharging of B1 and B2, which together supply VDD to the RF and other circuits. For a mobile station 10 that operates by transmitting and receiving during frames, the MODE signal can be toggled by the controller 18 at the frame rate (e.g., every 20 milliseconds), or at some multiple of the frame rate. That is, the MODE signal periodically transitions between the first and second states at rate given by (n×FR), where n is an integer and where FR is the frame rate. This can occur during a call, but preferably occurs during quiescent periods (e.g., during sleep mode operation while periodically monitoring a slot or slots within an assigned paging channel). For other types of mobile stations (e.g., AMPS mobile stations), suitable hold-up capacitors can be employed on the base band power buses to maintain the voltage during the switch-over between B1 and B2.

Since the base band power buses are switched between ground and +V1, and +V1 and VDD, suitable interface circuits must be employed to interface the base band circuits to, by example, the RF circuits which include MOD 14A and DEMOD 16A, which are connected between VDD and ground. These interface circuits are shown in FIG. 1 as the base band to RF interface (BB-RF INT) 14B and RF to base band interface (RF-BB INT) 16B, shown in dashed outline at the input of MOD 14A and at the output of DEMOD 16A, respectively. These interface circuits are described below in the discussion of FIGS. 4A, 4B, 5 and 6.

Figure 4A:
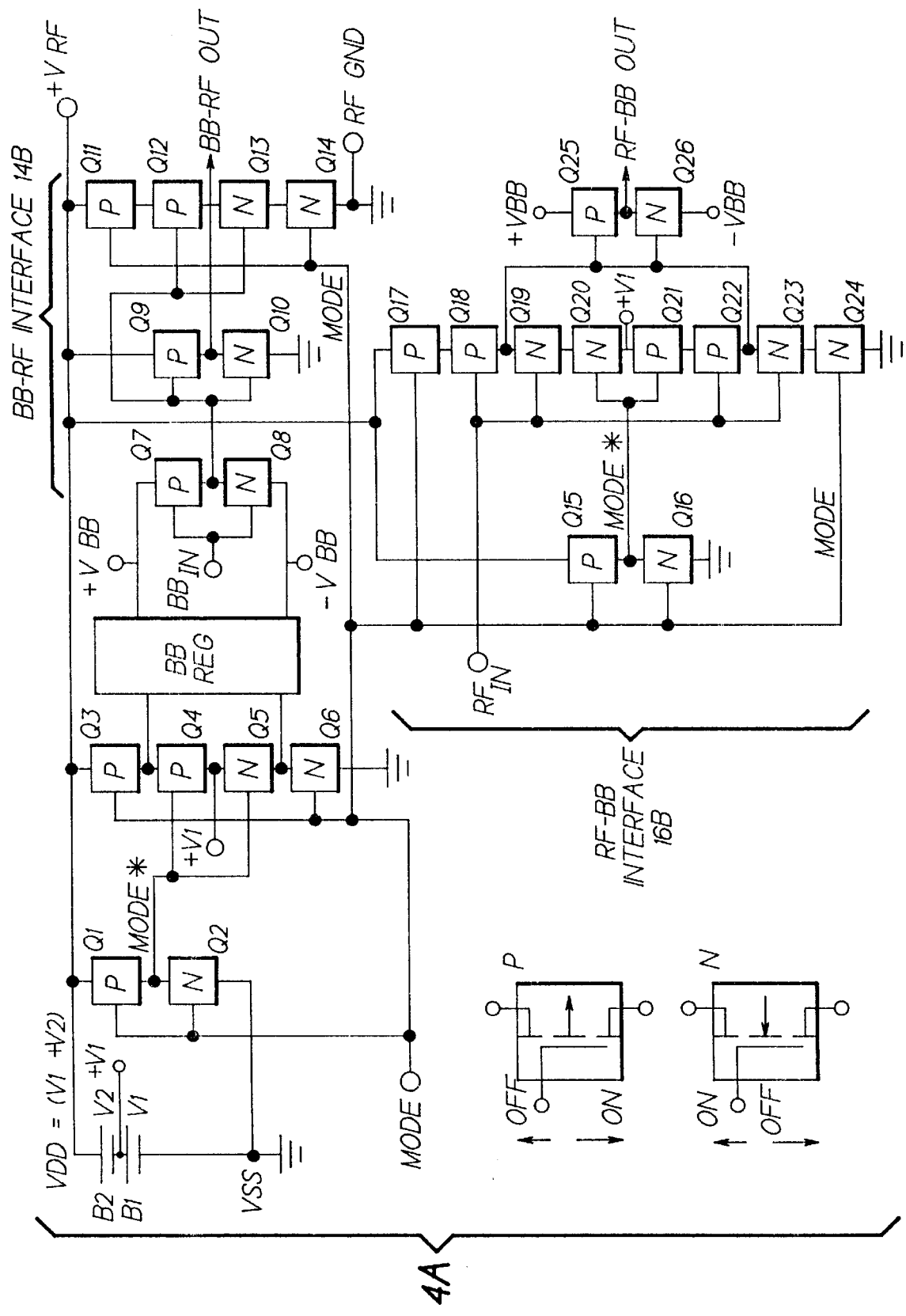
FIG. 4A is a schematic diagram, partly in block diagram form, that illustrates in greater detail one embodiment of the power supply and power distribution system, and which further illustrates base band to RF and RF to base band interface circuits.

Referring now to FIG. 4A, P and N channel MOSFETS Q1–Q24 are employed to implement the switches S1 and S2 as well as the BB-RF interface 14B and the RF-BB interface 16B. In this Figure the type of MOSFET (i.e., P channel or N channel) is indicated in the blocks designated Q1–Q24. The lower left portion of FIG. 4 shows the construction of suitable P and N channel MOSFETS. When the input to the P channel MOSFET is high the transistor is turned off, and when the input is low the transistor is turned on. The opposite condition exists for the N channel MOSFETS.

In FIG. 4A the transistor pair Q1 and Q2, and the transistor pair Q15 and Q16, form MODE signal inverters that output an inverted MODE signal (MODE*). Transistors Q3, Q4, Q5 and Q6 implement the switches S1 and S2 shown in FIG. 3. More particularly, Q3 and Q4 correspond to S1 and Q5 and Q6 correspond to S2. The outputs of Q3–Q6 are connected to the input of the base band regulator (if used). These transistors could be implemented within the BB REG, if desired, or they may be provided external to the BB REG. The inverter comprised of Q1 and Q2 could also be integrated into the BB REG, thereby reducing the I/O requirements by one pin.

The following Table illustrates the states of Q3–Q6 for the MODE signal being high and low.

TABLE

| MODE | HIGH | −V BB = VSS, +V BB = +V1 |
| --- | --- | --- |
| Q3 | OFF | |
| Q4 | ON | |
| Q5 | OFF | |
| Q6 | ON | |
| MODE | LOW | −V BB = +V1, +V BB = VDD |
| Q3 | ON | |
| Q4 | OFF | |
| Q5 | ON | |
| Q6 | OFF | |

Assuming for this example that the base band regulator is used, the output of the base band regulator is the voltages +V BB and −V BB which are connected to the two power buses of the base band circuitry. As is shown in the upper trace of FIG. 5, and assuming that no significant drop occurs within the BB REG, when the MODE signal is low the base band operating voltage is between +V1 and VDD, or 3.6 volts to 7.2 volts. Conversely, when the MODE signal is high the base band operating voltage is taken between ground (VSS) and +V1. As was stated above, the MODE signal is toggled so as to equalize the discharge of B1 and B2 due to the power consumption of the base band circuits.

FIG. 4A also shows that the RF voltage (+V RF and RF GND) is taken across both B1 and B2 (i.e., 7.2 volts). This being the case, the BB-RF interface 14B and the RF-BB interface 16B are employed for level shifting the signals that pass between the base band and RF circuitry. Although one of each type of interface circuit are shown, any number of each may be employed, depending on the number of signals that pass in each direction between the RF and base band circuits. Furthermore, and for a case where the signal flow is uni-directional, only one type of interface need be provided.

Not only must the interface circuitry accommodate the 2:1 difference in voltage potential between the RF and base band power buses, it can be appreciated that the interface circuitry must also accommodate the switching of the base band power buses between 0–3.6 volts and 3.6–7.2 volts.

Figure 5:
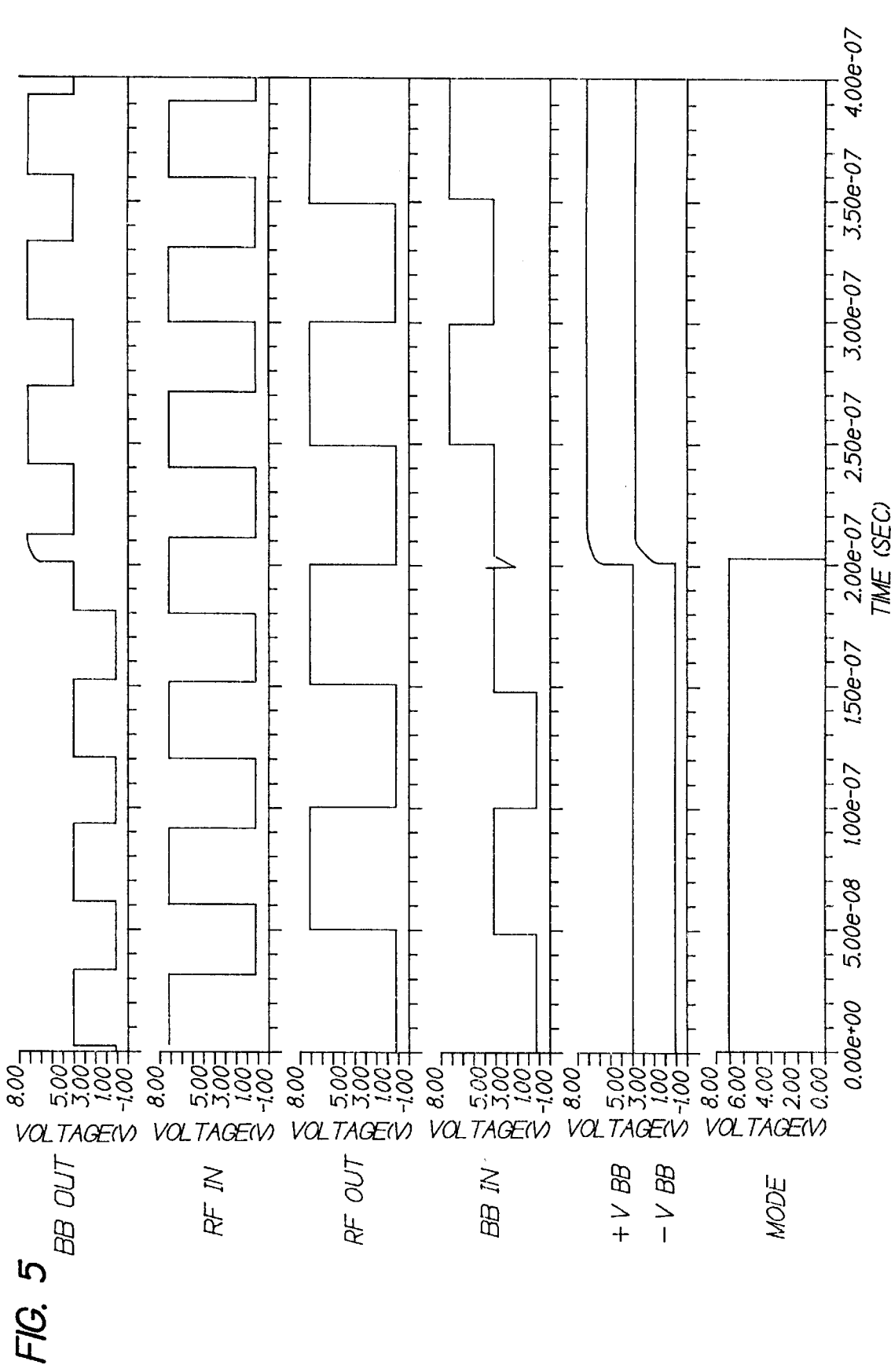
FIG. 5 is a timing diagram of the circuitry shown in FIGS. 4A and 4B.

Considering first the RF-BB interface 16B, and referring also now to FIG. 5, it can be seen that the RF IN signal transitions (ideally) between 0 volts and 7.2 volts. This signal is applied to transistors Q18, Q19, Q22 and Q23. Transistors Q17 and Q24 are driven by the MODE signal, while transistors Q20 and Q21 are driven by the inverted MODE signal (MODE*) that is output from the inverter pair Q15, Q16. The outputs of this serial chain of transistors is taken between the P channel MOSFET Q18 and N channel MOSFET Q19, and between the P channel MOSFET Q22 and N channel MOSFET Q23. The outputs drive transistors Q25 and Q26 are coupled between the base band power buses +V BB and −V BB. The output signal taken between Q25 and Q26 is the RF__BB output shown in the first trace of FIG. 5. It can be seen that this output signal transitions between 0–3.6 volts and 3.6–7.2 volts, depending on whether the MODE signal is high or low.

Turning now to the BB-RF interface 14B, the BB-IN signal is shown in the fourth trace of FIG. 5. The signal is applied to transistors Q7 and Q8, whose inverted output drives transistors Q9, Q10, Q12 and Q13. Transistors Q11 and Q14 are driven by the MODE signal. As shown in the third trace of FIG. 5, the resulting BB-RF output signal transitions (ideally) between 0 and 7.2 volts, or the potential across transistors Q9, Q10 and Q11–Q14. The fifth trace of FIG. 5 shows the levels of the base band power rails for the high and low states of the MODE signal, respectively.

Figure 6:
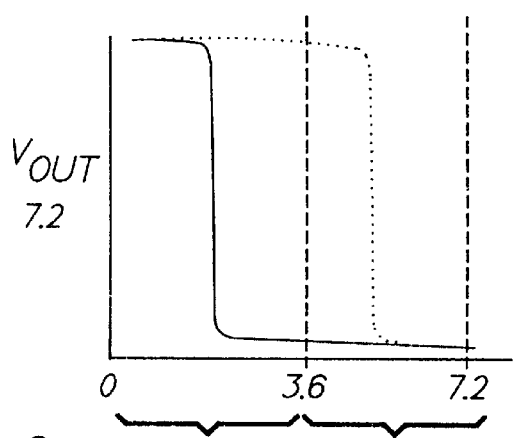
FIG. 6 graphically illustrates switching points for the base band to RF interface circuit of FIGS. 4A and 4B.

FIG. 6 illustrates the transition points of the BB-RF interface 14B for the MODE high and MODE low conditions, and illustrate that the BB-RF interface 14B is responsive to the state of the MODE signal for accommodating the changes in level of the BB IN signal.

Figure 4B:
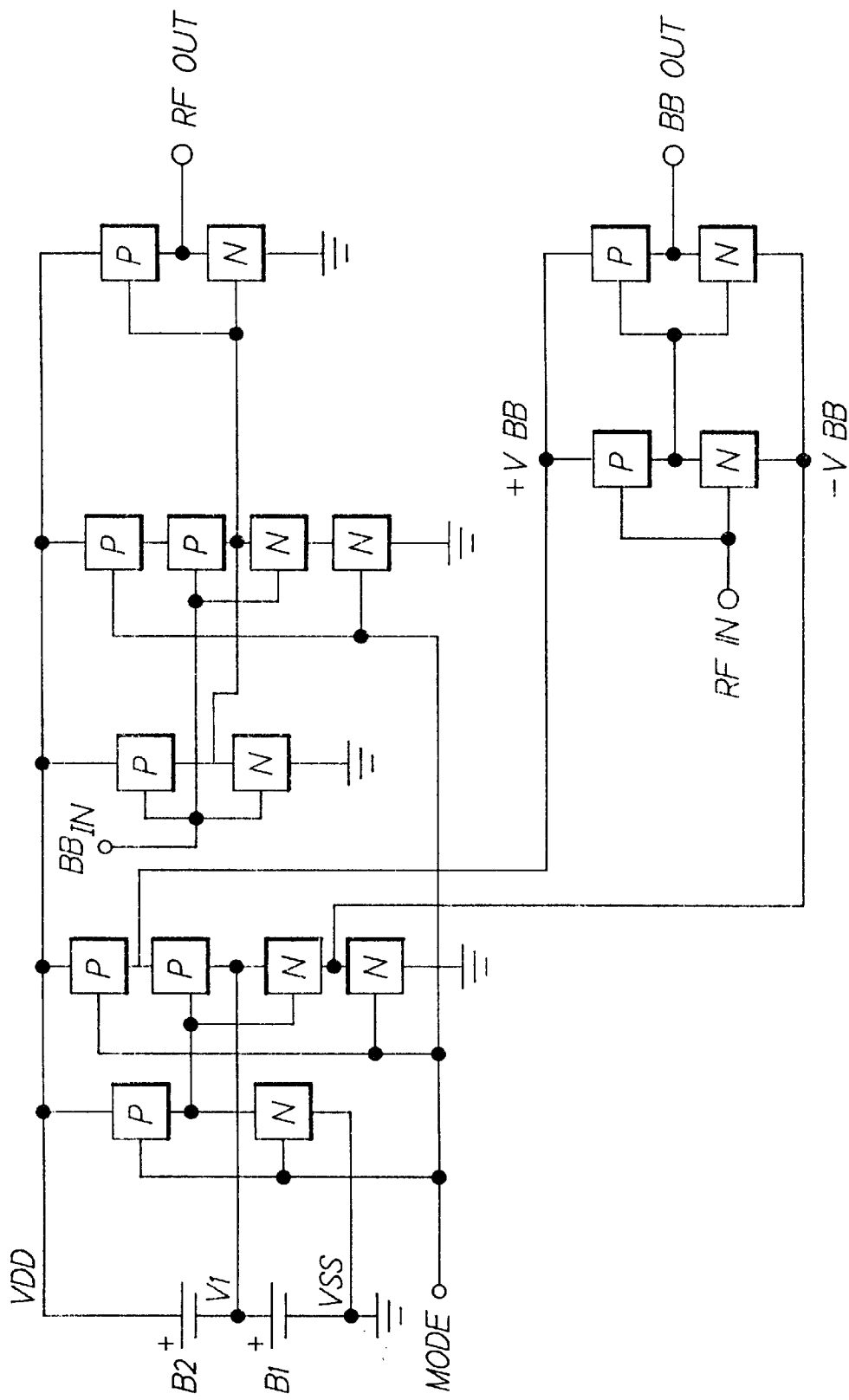
FIG. 4B is a schematic diagram, partly in block diagram form, that illustrates in greater detail a second embodiment of the power supply and power distribution system, and which further illustrates base band to RF and RF to base band interface circuits.

FIG. 4B illustrates a simplified embodiment of the circuitry shown in FIG. 4A.

Although described in the context of preferred embodiments, it should be realized that a number of modifications to these teachings may occur to one skilled in the art. By example, other battery types, battery potentials, transistor types and numbers, etc. can be employed. Furthermore, the use of this invention is not limited to only powering base band circuitry with the level shifting power supply. By example, in another embodiment the base band circuitry and the RF circuitry may be powered with VDD, while the power supplied to the user interface circuitry (e.g., display 20, keypad 22, etc.) and/or the mobile station's audio circuitry may be switched between VSS-V1 and V1-VDD.

Figure 7A:
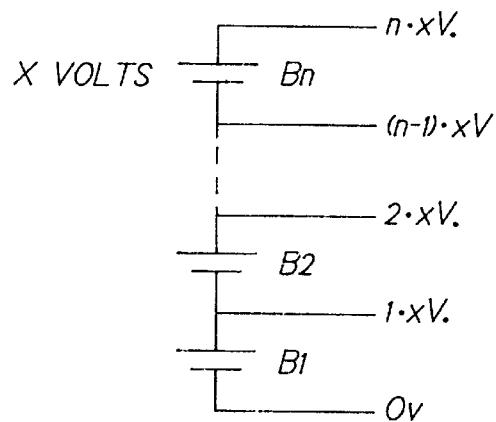
FIGS. 7A and 7B are circuit diagrams that illustrate an extension of the teaching of this invention to n batteries, where n>2.
Figure 7B:
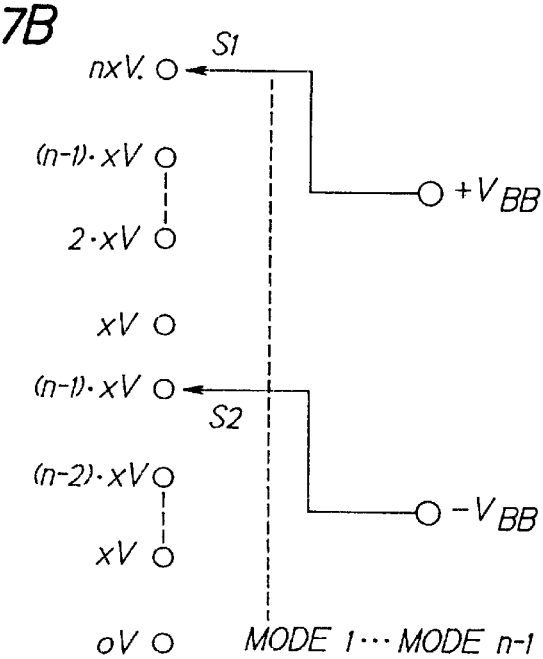

Also, the invention has been described thus far in the context of two batteries B1 and B2. However, and referring to FIGS. 7A and 7B, n batteries can be used (B1 through Bn), each providing X volts. For example, if n=8 and X=1.2, then the top-most line in FIG. 7A would be at a potential of 9.6 volts. For this case the MODE signal can assume a more than two states, as shown in FIG. 7B, for selecting base band potentials +VBB and −VBB using switches $S_1$ and $S_2$, as shown. In the illustrated switch positions, and assuming once again that n=8 and X=1.2 volts, +VBB=(8) (1.2)=9.6 volts and −VBB=(7)(1.2)=8.4 volts. That is, in this embodiment the potential difference between +VBB and −VBB is X volts, or the voltage across one battery. Other arrangements could be provided, such as by arranging the switching such that the potential difference between +VBB and −VBB is mX volts, or the voltage across m batteries (e.g., m=2 and n=8).

Figure 7C:
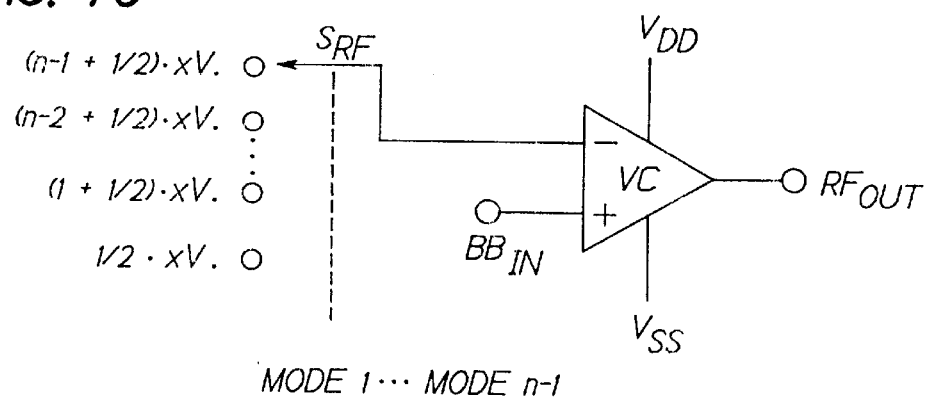
FIG. 7C illustrates a further embodiment of the base band to RF interface.

FIG. 7C illustrates an embodiment wherein the base band to RF interface 14B is comprised of a voltage comparator (Vc) For this embodiment the inverting input is switched with switch $S_{RF}$ by the MODE signal between potentials (0.5 X volts) and (n−1+0.5) times X volts. The non-inverting input is connected to the BB_IN signal, and the output transitions between VDD and VSS. While this example may be conceptually simpler than the embodiments shown in FIGS. 4A and 4B, in a practical embodiment more circuit board space may be required.

Thus, while the invention has been particularly shown and described with respect to preferred embodiments thereof, it will be understood by those skilled in the art that changes in form and details may be made therein without departing from the scope and spirit of the invention.

What is claimed is:

1. A wireless communicator, comprising:
    a power source having outputs providing voltages VSS, VDD, and V1, where V1=(VDD−VSS)/2, said power source being coupled to a first load for powering said first load with a voltage having a magnitude that is a difference between VSS and VDD; and
    a power source switching unit having first inputs coupled to said outputs of said power source for receiving said voltages VSS, VDD and V1, a second input for receiving a MODE signal, and outputs coupled to a second load, said power source switching unit being responsive to a first state of said MODE signal for powering said second load with a voltage having a magnitude that is a difference between VSS and V1, and being responsive to a second state of said MODE signal for powering said second load with a voltage having a magnitude that is a difference between V1 and VDD.

2. A wireless communicator as set forth in claim 1, wherein said power source is comprised of a plurality of batteries connected in series.

3. A wireless communicator as set forth in claim 1, wherein said first load is comprised of RF circuitry, and wherein said second load is comprised of base band circuitry.

4. A wireless communicator as set forth in claim 1, wherein power source switching unit is comprised of a plurality of switch means controlled by said MODE signal.

5. A wireless communicator as set forth in claim 4, wherein said switch means are comprised of transistors.

6. A wireless communicator as set forth in claim 4, wherein said switch means are comprised of N channel and P channel FETS.

7. A wireless communicator as set forth in claim 1, and further comprising:
    an interface coupled between an output of said first load and an input of said second load, said interface for level shifting at least one first electrical signal received from said output of said first load, said at least one first electrical signal periodically transitioning between VSS and VDD, said interface having an input for receiving said MODE signal and being responsive to said first state of said MODE signal for outputting a first level shifted signal that periodically transitions between VSS and V1, and being responsive to said second state of said MODE signal for outputting a second level shifted signal that periodically transitions between V1 and VDD, and wherein said first and said second level shifted signals are passed to said input of said second load.

8. A wireless communicator as set forth in claim 1, and further comprising:
    an interface coupled between an input of said first load and an output of said second load, said interface for level shifting at least one first electrical signal received from said output of said second load and outputting a level shifted signal to said input of said first load that periodically transitions between VSS and VDD, said interface having an input for receiving said MODE signal and being responsive thereto for outputting said level shifted signal that periodically transitions between VSS and VDD when said at least one first electrical signal periodically transitions, when said MODE signal is in said first state, between VSS and V1, and also when said at least one first electrical signal periodically transitions, when said MODE signal is in said second state, between V1 and VDD.

9. A wireless communicator as set forth in claim 1, wherein said MODE signal is sourced by a controller of said wireless communicator.

10. A wireless communicator as set forth in claim 1, wherein said MODE signal periodically transitions between the first and second states.

11. A wireless communicator as set forth in claim 1, wherein said MODE signal periodically transitions between said first and second states at rate given by (n×FR), where n is an integer and where FR is a Frame Rate.

12. A method for operating a wireless communicator, comprising the steps of:
    providing a power source having outputs with voltages VSS, VDD, and V1, where V1=(VDD−VSS)/2, the power source being coupled to a first load for powering the first load with a voltage having a magnitude that is a difference between VSS and VDD;
    periodically toggling a MODE signal between first and second states; and
    operating a power source switching unit having first inputs coupled to the outputs of the power source for receiving the voltages VSS, VDD and V1, a second input for receiving the MODE signal, and outputs coupled to a second load, the power source switching unit being responsive to the first state of the MODE signal for powering the second load with a voltage having a magnitude that is difference between VSS and V1, and being responsive to the second state of the MODE signal for-powering the second load with a voltage having a magnitude that is a difference between V1 and VDD.

13. A method as set forth in claim 12, and
    operating an interface to level shift at least one first electrical signal received from an output of the first load and passed to an input of the second load, the at least one first electrical signal periodically transitioning between VSS and VDD, the interface having an input for receiving the MODE signal and being responsive to the first state of the MODE signal for outputting a first level shifted signal that periodically transitions between VSS and V1, and being responsive to the second state of the MODE signal for outputting a second level shifted signal that periodically transitions between V1 and VDD.

14. A method as set forth in claim 12, and further comprising a step of:

operating an interface to level shift at least one first electrical signal received from an output of the second load and passed to an input of the first load, the level shifted signal periodically transitioning between VSS and VDD, the interface having an input for receiving the MODE signal and being responsive thereto for outputting the level shifted signal that periodically transitions between VSS and VDD when the at least one first electrical signal periodically transitions, when the MODE signal is in the first state, between VSS and VDD, and also when the at least one first electrical signal periodically transitions, when the MODE signal is in the second state, between V1 and VDD.

15. A method as set forth in claim 12, wherein the step of toggling the MODE signal is performed by a controller of the wireless controller.

16. A method as set forth in claim 15, wherein the MODE signal is toggled between the first and second states at rate given by (n×FR), where n is an integer and where FR is a Frame Rate.

17. A wireless communicator, comprising:

a power source comprised of a plurality of series connected batteries providing a maximum output voltage VSS, referenced to a minimum voltage VDD, said power source being coupled to a first load for powering said first load with a voltage having a magnitude that is a difference between VSS and VDD;

a controller for generating a MODE signal that periodically transitions through a plurality of states;

a power source switching unit having first inputs coupled across individual ones of said plurality of batteries, a second input for receiving said MODE signal, and outputs coupled to a second load for powering the second load, said power source switching unit being responsive to said MODE signal periodically transitioning through said plurality of states for connecting said second load across different ones of said plurality of batteries; and level shifting circuits coupled between said first and second loads, said level shifting circuits being responsive to said MODE signal periodically transitioning through said plurality of states for level shifting electrical signals passing between said first and second loads in accordance therewith.

18. A wireless communicator as set forth in claim 17, wherein said MODE signal periodically transitions through said plurality of states according to a rate established by a wireless communicator internal timing signal.

* * * * *

UNITED STATES PATENT AND TRADEMARK OFFICE
CERTIFICATE OF CORRECTION

PATENT NO. : 5,877,564
DATED : Mar. 2, 1999
INVENTOR(S) : Kuiri

It is certified that error appears in the above-identified patent and that said Letters Patent is hereby corrected as shown below:

IN THE CLAIMS:

In column 8, line 56, after "and" insert --further comprising a step of:--

Signed and Sealed this

Twenty-seventh Day of July, 1999

Attest:

Q. TODD DICKINSON

*Attesting Officer*    *Acting Commissioner of Patents and Trademarks*